United States Patent Office 3,641,115
Patented Feb. 8, 1972

3,641,115
METHOD FOR PRODUCING ESTERS OF POLYCYCLIC COMPOUNDS
David W. Peck, Charleston, and Robert R. Gentry, St. Albans, W. Va., assignors to Union Carbide Corporation
No Drawing. Filed Aug. 22, 1968, Ser. No. 754,735
Int. Cl. C07c *69/76*
U.S. Cl. 260—475 SC                    9 Claims

ABSTRACT OF THE DISCLOSURE

A method for producing esters of carboxyalkylfluorenes, carboxyalkylcarbazoles, carboxyalkylindenes and carboxyalkylindoles by the rapid catalytic reaction of an acrylate ester and a fluorene, carbazole, indene or indole is described. The catalysts are basic catalysts and the reaction proceeds only when the reactants are in contact with a catalytic amount of the basic catalyst and the reactants are rapidly admixed together.

---

This invention relates to new catalytic procedures for producing alkyl esters of certain polycyclic compounds.

The esters of the carboxyalkylfluorenes, carboxyalkylcarbazoles, carboxyalkylindenes and carboxyalkylindoles are known. However, it has always been difficult to produce them, and, in fact, H. A. Bruson, J. Am. Chem. Soc., vol. 64, page 2457, has stated that the esters of carboxyethylfluorene could not be obtained by the reaction of an alkyl acrylate with fluorene. As a consequence, these latter esters have been produced by expensive, multistep processes involving (1) the reaction of fluorene with potassium acrylate at temperatures above 200° C., (2) acidification of the resulting dipotassium salt, (3) purification of the salt, and (4) esterification thereof to the ester. This complete process is time consuming and because of the many steps involved economically unfeasible because of the low overall yield.

It has now been found that the esters of the stated polycyclic compounds can be produced directly by a one-step catalytic process in high yield under relatively mild reaction conditions, all within a relatively short period of time.

In the process of the instant invention an alkyl acrylate and the polycyclic compound are mixed and reacted together as quickly as possible in contact with certain basic catalysts and preferably in contact with certain solvents.

The acrylate esters that can be used are represented by the general formula:

$$CH_2=\underset{\underset{R'}{|}}{C}-COOR$$

in which R is an alkyl group containing at least one carbon atom, preferably of from 1 to about 10 or more carbon atoms or an aryl group and R' is hydrogen or methyl. The particular R group or the size thereof is not critical and any acrylate ester can be used. Illustrative thereof one can mention methyl acrylate, ethyl acrylate, propyl acrylate, butyl acrylate, hexyl acrylate, 2-ethylhexyl acrylate, decyl acrylate, cosyl acrylate, methyl methacrylate, ethyl methacrylate, 2-ethylhexyl methacrylate, phenyl acrylate, benzyl acrylate, tolyl acrylate, xylyl acrylate, naphthyl acrylate, phenyl methacrylate, and the like.

The suitable polycyclic compounds reacted with the acrylate ester are those represented by the formula:

II 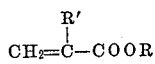

wherein X represents either a divalent $$-\underset{\underset{|}{H}}{N}-$$

group or a divalent methylene group (—CH₂—); R" and R'" when taken singly represent a hydrogen atom, an alkyl radical containing up to about 10 carbon atoms or an aryl radical containing up to about 10 carbon atoms; and R" and R'" when taken jointly represent the divalent group of the formula —CH=CH—CH=CH—. The polycyclic compounds subgeneric thereto are the fluorenes:

IIA 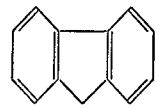

the carbazoles:

IIB 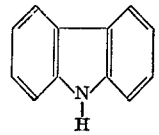

the indenes:

IIC 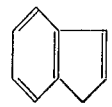

and the indoles:

IID 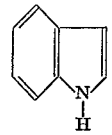

The polycyclic compounds can be unsubstituted or substituted with any substituent group which does not materially interfere with or retard the reaction, or deleteriously affect the catalyst; e.g. alkyl, alkoxy, halogen, nitro, aryl, and the like. Illustrative of the suitable polycyclic compounds one can mention fluorene, carbazole, indene, indole, 9-methylfluorene, 2-methylfluorene, 3-ethylfluorene, 4-phenylfluorene, 2-methoxyfluorene, 2-ethoxyfluorene, 5-ethylindene, 2-chlorofluorene, 4-methylindole, 2-methylindole, 3-ethoxycarbazole, 2-butylcarbazole, 2-decylindole, 2-decylindene, and the like.

The catalysts that are used to catalyze the reaction between the acrylate and the polycyclic compound are basic catalysts such as the benzyltrialkylammonium alkoxides and hydroxides wherein the alkyl group contains from 1 to about 10 carbon atoms and the alkoxide group contains from 1 to about 4 carbon atoms; the complex salts of the alkali metal amides such as sodium amide and potassium amide with a lower dialkylsulfoxide such as dimethylsulfoxide and diethylsulfoxide or with a polyethylenepolyamine such as diethylenetriamine, triethylenetetramine or dipropylenetriamine be useful. A catalytic amount of the basic catalyst must be present at all times. The total amount that can be used will vary from about 0.5 to about 8 weight percent, or higher, based on the polycyclic compound, preferably from about 1 to about 2 weight percent. Illustrative catalysts include benzyltrimethylammonium methoxide, benzyltriethylammonium ethoxide, benzyltrimethylammonium ethoxide, tetraethylammonium ethoxide, benzyltrimethylammonium butoxide, benzylthimethylammonium hydroxide, tetramethylammonium methoxide, benzyltriethylammonium hydroxide, benzyltributylammonium hydroxide, benzyltripropyl ammonium methoxide, dibutyldimethylammonium hydroxide, a solvent solution of sodium amide per se, sodium amide-dimethylsulfoxide, sodium amide-diethylsulfoxide, potassium amide-dimethylsulfoxide, sodium amide diethylenetriamine, and the like.

The reaction can be carried out in the absence of a solvent. However, it has been found that the reaction is more readily controlled when an inert organic solvent is present; the concentration thereof is not critical and can be varied at the will of the skilled scientist. Any inert organic solvent that does not affect the catalytic reaction or react with any of the reactants can be used. Thus, benzene, toluene, xylene, dioxane, hexane, octane and the like are satisfactory solvents. However, certain solvents will result in little or no reaction taking place, such as the alcohols methanol, ethanol, dimethyl sulfoxide per se, or 1-methyl-2-pyrrolidone, while other solvents such as morpholine or diethylene-triamine per se react with the acrylate and interfere with the reaction. A skilled organic chemist can readily determine from a small scale preliminary bench run whether or not a particular solvent can be used.

The reaction can be carried out at any temperature from about 0° C. up to the boiling point of the reaction mixture. The temperature is, however, preferably from about 20° C. to about 120° C.

The pressure of the reaction is not critical and can be atmospheric, sub-atmospheric, or super-atmospheric. The reaction is continued until essentially complete reaction of the reactants has occurred. The time therefor, as is known to those skilled in the art, will depend to some extent on the temperature, the pressure, the size of the batch, the specific catalysts and reactants employed, and thus cannot be fixed.

An excess of acrylate ester is generally charged to react with the polycyclic compound in order to achieve maximum conversion. However, stoichiometric amounts are satisfactory. When X is the divalent $$\overset{H}{\underset{|}{-N-}}$$

group one mole of the acrylate ester is needed to obtain a stoichiometric reaction since there is only one active hydrogen atom present. However, when X is the divalent —CH$_2$—group, there are two active hydrogens and thus two moles of the acrylate ester are needed. When an excess of acrylate ester is used, the amount of the excess is not critical and is a choice made by the scientist.

The esters of the polycyclic compounds that are produced by the process of this invention are represented by the general formula:

III 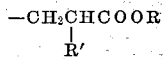

wherein Y represents the divalent group of the formula:

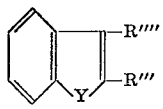

when III is a fluorene or indene compound; or the divalent group of the formula:

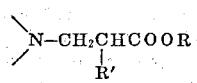

when III is a carbazole or indole compound; or a divalent group of the formula:

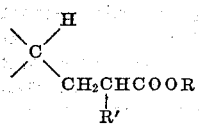

when III is an indene compound; R''' when taken singly is a hydrogen atom, or an alkyl radical or aryl radical containing up to about 10 carbon atoms; R'''' when taken singly is a hydrogen atom, or an alkyl radical or aryl radical containing up to about 10 carbon atoms; or when III is an indene compound a group of the formula $$-CH_2CHCOOR$$
$$\underset{R'}{|}$$

and R''' and R'''' when taken jointly represent the divalent group of the formula —CH=CH—CH=CH—. The esters subgeneric thereto are the esters of the carboxyalkylfluorenes of the formula:

IIIA 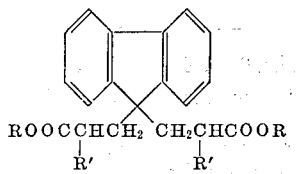

the esters of the carboxyalkylcarbazoles of the formula:

IIIB 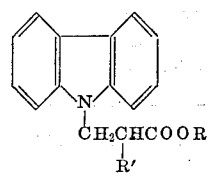

the esters of the carboxyalkylindenes of the formulas:

IIIC 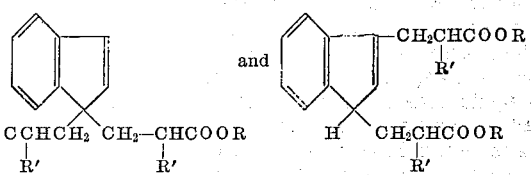

and the esters of the carboxyalkylindoles of the formula:

IIID 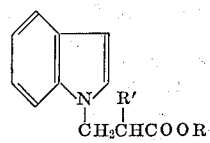

corresponding to the polycyclic compounds II–A to II–D previously described. Illustrative thereof one can mention the dimethyl ester of 9,9-bis(2-carboxylethyl) fluorene, the diethyl ester of 9,9-bis(2-carboxyethyl) fluorene, diethylester of 9,9-bis(2-carboxypropyl)fluorene, the di-2-ethylhexyl ester of 9,9-bis(2-carboxyethyl)fluorene, the dibutylester of 9,9-bis(2-carboxyethyl)fluorene, methyl 3-(9-carbazole)propionate, ethyl 3-(9-carbazole) propionate, ethyl 3-(9-carbazole)-2-methylpropionate, 2-ethylhexyl 3-(9-carbazole)propionate, decyl 3-(9-carbazole)propionate, ethyl 3-(1-indole)propionate, methyl 3-(1-indole)propionate, ethyl 3-(1-indole) - 2 - methylpropionate, hexyl 3-(1-indole)propionate, the dimethyl ester of 1,1-bis(2-carboxyethyl)indene, the dimethyl ester of 1,3-bis(2-carboxyethyl)indene, the diethyl ester of 1,1-bis-2-carboxyethyl)indene, the diethyl ester of 1,1-bis (2-carboxypropyl)indene, the di-2-ethylhexyl ester of 1,1-bis(2-carboxyethyl)indene, the diethyl ester of 9,9-bis(2-carboxyethyl)-2-methylfluorene, methyl 3-[9-(3-ethyoxycarbazole)]propionate, and the like.

The order of addition is not critical, though precautions should be taken to minimize or preclude reaction of the acrylate ester with the catalyst and destroy its catalytic action on the reaction. Thus, it is not satisfactory to premix the acrylate ester and catalyst such as benzyltrimethylammonium methoxide and add the mixture to a solution of the polycyclic compound such as fluorene. Nor is it satisfactory to add the acrylate ester slowly to a mixture of this polycyclic compound, catalyst and solvent, although some small yield of product may be obtained in this manner. It is, however, satisfactory to add the acrylate ester rapidly to this mixture of polycyclic compound, catalyst and solvent; although the exotherm may sometimes be uncontrollable a good yield generally results.

A preferred procedure is to add a solution of the catalyst, at a rapidly controlled rate, to a solution of the polycyclic compound and acrylate ester in a solvent such as toluene. The catalyst solution is added continuously at a rapid rate sufficient to control the exotherm. Continuous addition is important to maintain a constant presence of fresh catalyst and to keep the reaction going. A rapid reaction has been found necessary for the success of the process and if the reaction, once initiated is allowed to cease before completion, it generally cannot be initiated again and will not go to completion.

Another satisfactory procedure is to add a solution of the polycyclic compound fluorene and the catalyst in the inert organic solvent to a solution of the acrylate ester in the solvent. The important feature is a rapid rate of addition and rapid mixing adequate to maintain sufficient active catalyst in the reaction mixture to insure completion of the reaction, while keeping the reaction under control. At the completion of the reaction, the desired compounds are recovered by conventional distillation and recrystallization procedures.

It is also within the scope of this invention to use a flow reaction system. For example, two streams may be pumped simultaneously into a tubular reactor wherein mixing is vigorous. The two streams may be (1) a mixture of polycyclic compound, acrylate ester and solvent and (2) a solution of catalyst and solvent. Alternatively the two streams may be (1) a mixture of fluorene, catalyst and solvent and (2) the acrylate ester per se or in solution.

The compounds produced by the processes of this invention have known uses. Thus, they can be sulfonated as described in U.S. 3,096,358 and used to produce linear polyesters as described in U.S. 3,184,434. The indenes can also be sulfonated and the products used to produce linear polyesters in the same manner. The indoles are precursors for the 3-indolepropionic acids, which are plant growth regulators. The carbazoles and indoles are also useful intermediates for the production of dyestuffs.

The following examples serve to illustrate the invention.

EXAMPLE 1

Forty-two grams (0.25 mole) of fluorene and 9 grams of a 40 percent solution of benzyltrimethylammonium methoxide in methanol as catalyst were dissolved in 200 ml. of dioxane. When 55 grams (0.55 mole) of ethyl acrylate was poured into this solution all at once, it darkened and the temperature rose to 45°–50° C. The product was heated overnight on a steam bath, then poured into one liter of water, precpitating yellow solids. The aqueous phase was decanted and the solids washed with two 300 ml. portions of methanol and filtered. The filtered solids were washed with 200 ml. of methanol then air dried yielding 47 grams (0.13 mole, 51.3%) of a light yellow solid melting at 98°–99° C. Extraction of the combined methanol washes and the aqueous phase with isopropyl ether yielded an additional 15 grams of solid. An ethanol recrystallization of the combined solids raised the melting point to 101–102° C. The infrared and NMR spectra were consistent for the diethyl ester of 9,9-bis(2-carboxyethyl)fluorene. The NMR also indicated the presence of a small portion of the dimethyl ester, coming apparently from the methoxide group of the catalyst.

In a similar manner, 2-methyl-9,9-bis(2-carboxyethyl)fluorene is produced from 2-methylfluorene.

EXAMPLE 2

Forty-two grams (0.25 mole) of fluorene and 6 grams of the same catalyst used in Example 1 were dissolved in 200 grams of dioxane. Addition of 60 grams (0.6 mole) of ethyl acrylate within a one minute period caused an exothermic reaction which darkened the solution and raised the temperature to 82°. After 5 minutes the temperature was 58° C. and a vapor phase chromatogram of the mixture indicated that 96% of the fluorene had reacted. The mixture was stirred for one hour and then allowed to stand at room temperature overnight. The excess ethyl acrylate and solvent were removed by distillation to a kettle temperature of 45° C. at 20 mm. The solid residue remaining was washed in a Waring Blendor with 500 ml. of water, then air dried overnight yielding 82 grams (0.224 mole) of product (90% yield based on fluorene) with melting point 85°–93° C. Recrystallization of the crude product from hexane yielded 69 grams (0.19 mole, 75%) of solids M.P. 97°–98° C. Infrared and NMR spectra indicated the product was the diethyl ester of 9,9 - bis(2 - carboxyethyl)fluorene with some methyl ester present.

EXAMPLE 3

A mixture of 67 grams of toluene, 14 grams of fluorene (0.084 mole) and 2 grams of the same catalyst used in Example 1 was added continuously and rapidly to a stirred solution of 20 grams of ethyl acrylate (0.2 mole) in 20 ml. of toluene. The exothermic reaction was controlled at 38°–40° C. by the addition rate. The reaction mixture was stirred for 1 hour after the final addition, giving a product that contained only 0.8% of unreacted fluorene. Excess ethyl acrylate and solvent were removed by distillation to a kettle temperature of 50° C. at 20 mm. The solid residue was slurried in hexane, filtered and dried, yielding 21 grams (0.057 mole, 67% yield) of cream colored solids, M.P. 100°–102° C. Recrystallization from isopropanol gave 18.9 grams (0.052 mole, 61%) of the diethyl ester of 9,9-bis(2-carboxyethyl)fluorene, M.P. 103°–104° C.

EXAMPLE 4

Twenty grams of fluorene (0.12 mole), 30 grams of toluene and 28 grams of ethyl acrylate (0.28 mole) were combined and heated to 40° C. A solution of 1 ml. of the same catalyst used in Example 1 in 5 ml. toluene was added continuously over a 4-minute period, giving an exothermic reaction which raised the temperature to 90° C. Analysis of the reaction mixture after ½ hour indicated all the fluorene had reacted. The mixture was cooled to room temperature and the white solids that precipitated were filtered off, hexane washed and air dried giving 20 grams (0.055 mole, 46% yield) of the diethyl ester of 9,9-bis(2-carboxyethyl)fluorene, M.P. 105°–106° C. Distillation of the filtrate to a kettle temperature of 60° C. at 10 mm. gave a solid residue which was washed with hexane, yielding 14 grams of the diethyl ester of 9,9-bis(2-carboxyethyl)fluorene, M.P. 99–102° C. Total yield was thus 0.093 mole or 77.5%, based on fluorene.

The same procedure with benzene as the solvent gave a crude yield of 85% of the diethyl ester of 9,9-bis(2-carboxyethyl)fluorene.

EXAMPLE 5

Dissolved 14 grams of fluorene (0.084 mole) and 20 grams of ethyl acrylate (0.2 mole) in 67 grams of hexane. The solution was heated to reflux and a solution of the same catalyst used in Example 1 (1 gram in 10 ml. of toluene) was rapidly added dropwise. The reaction was exothermic, causing the hexane to boil vigorously. When approximately ⅔ of the catalyst solution had been added the temperature began to drop. The balance of the catalyst solution was added rapidly, the product was stirred for 30 minutes and allowed to cool to room temperature. The solids that precipitated were filtered off and dried. The diethyl ester of 9,9-bis(2-carboxyethyl)fluorene obtained melted at 102°–103° C. and weighed 22 grams (0.06 mole) for a yield of 71%.

EXAMPLE 6

Two grams of fluorene and 10 grams of ethyl acrylate were heated to 35° C. and 0.2 ml. of the same catalyst used in Example 1 was added dropwise to the stirred solution. The solution darkened and temperature rose to 60° C. Vapor phase chromatographic analysis of the product after 5 minutes indicated that 96% of the fluorene had reacted. Excess ethyl acrylate was removed and the solids remaining were washed once with hexane yielding 1.7 grams (85% yield) of the diethyl ester of 9,9-bis(2-carboxyethyl)fluorene, M.P. 105°–106° C.

EXAMPLE 7

A solution of 67 grams of toluene, 14 grams (0.084 mole) of fluorene, and 2 ml. of 35 percent benzyltrimethylammonium hydroxide in methanol was added over a 7-minute period to 20 grams (0.2 mole) of ethyl acrylate in 20 grams of toluene. The addition was started at 26° C. but the temperature increased to 54° by the exothermic heat of reaction. Vapor phase chromatographic analysis of the reaction mixture one hour after the addition indicated 86 percent of the fluorene was reacted. Excess ethyl acrylate and solvent were removed by distillation to a kettle temperature of 50° C. at 20 mm. The solid residue was stirred with hexane, filtered and dried, yielding 20.8 grams (0.057 mole, 60 percent yield) of the diethyl ester of 9,9-bis(2-carboxyethyl)fluorene, M.P. 104° to 105° C.

EXAMPLE 8

A catalyst solution was prepared by adding 0.8 gram sodium amide to 10 ml. dimethylsulfoxide, liberating ammonia and giving a basic anion as follows:

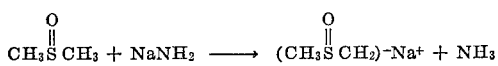

The catalyst solution was rapidly added at 35° C., over a 3-minute period, to a solution of 14 grams (0.084 mole) of fluorene, 20 grams (0.2 mole) of ethyl acrylate and 30 grams of toluene. The heat of the reaction raised the temperature to 90° and an orange-brown liquid product resulted. Distillation to a kettle temperature of 50° C. at 20 mm. removed the excess acrylate and solvent. The residue was a sticky solid mass. The residue was extracted with 300 ml. of n-hexane leaving 19 grams of sticky solids. The hexane extracts were evaporated on a steam bath yielding 21 grams of yellow solids; 10 grams of the solids were recrystallized from isopropanol yielding 8 grams of white solids, M.P. 104°–105°. NMR spectroscopy confirmed that the material was the diethylester of 9,9-bis(2-carboxyethyl)fluorene.

EXAMPLE 9

Twenty grams (0.2 mole) of ethyl acrylate was added dropwise over a 30-minute period to a stirred solution of 17 grams (0.1 mole) of fluorene, 100 ml. of dioxane and 2.5 ml. of 40 percent benzyltrimethylammonium methoxide in methanol. The ethyl acrylate was slowly added at 22° C. and the reaction temperature rose slowly to 26° C. The mixture was stirred for 1 hour after the addition. Vapor phase chromatographic analysis of the product indicated 80 percent of the fluorene was stilled unreacted. The example shows that the reaction is not successful when the acrylate ester is slowly added to the reaction mixture.

EXAMPLE 10

A 30-gallon glass lined reactor was charged with 25 lb. of recrystallized fluorene having a purity of 97%, 36 lb. of ethyl acrylate and 60 lb. of toluene. A catalyst solution [3 lb. of benzyltrimethylammonium ethoxide (40% in ethanol) dissolved in 10 lb. of toluene] was pumped at a rate of 145 cc./min. into the reaction mixture which had been heated to 35° to dissolve the fluorene. The reaction temperature was allowed to rise with no cooling, leveling off at 85–91°. The reaction product was stirred an additional hour after the catalyst addition was complete. Vapor phase chromatographic analysis of the product indicated complete reaction. Solvent and excess ethyl acrylate were stripped from the product at kettle temperature 60° C. at 100 mm., leaving the diester of 9,9-bis(2-carboxyethyl)fluorene, which was recrystallized by adding 50 pounds of isopropanol, refluxing 30 minutes, then cooling with stirring to 25°. The resulting slurry was drained, filtered on a large Buchner funnel, slurried in methanol, filtered and air dried. Another 25 lb. of fluorene was reacted with ethyl acrylate in like manner. A yield of 78 lb. (73%) of the diester of 9,9-bis(2-carboxyethyl)fluorene, a white solid, was obtained. Random sampling of the diester of 9,9-bis(2-carboxyethyl)fluorene, from the two batches gave melting points of 105.5°–106° C. and 106°–106.5° C.

EXAMPLE 11

Forty-two grams of (0.25 mole) fluorene, 51 grams (0.6 mole) methyl acrylate and 90 grams of toluene were combined and heated to 35° C. A solution of 6 grams of benzyltrimethylammonium methoxide (40% in methanol) in 30 grams of toluene was rapidly added, raising the temperature to 92°. Vapor phase chromatographic analysis of the product after one hour indicated complete reaction of the fluorene. The solvent and excess methyl acrylate were removed by heating to a kettle temperature of 70° C. at 10 mm. on an 18″ Vigreux still, and the residue slurried with hexane, filtered and air dried. The yield of product was 74 grams of solids (88% crude yield) having a melting point of 76–78° C. Recrystallization from isopropanol raised the M.P. to 80–82° C. and yielded 66 grams of (78% yield) white crystals. A second recrystallization from methanol yielded 54 grams (63.5%), M.P. 82–83° C. The NMR spectrum showed that the solid was the dimethyl ester of 9,9-bis(2-carboxyethyl)fluorene.

EXAMPLE 12

Forty-two grams of fluorene (0.25 mole), 76 grams of butyl acrylate (0.6 mole) and 90 grams of toluene were charged to a 500 ml. flask and heated to 35°. A solution of 6 grams of benzyltrimethylammonium methoxide (40% in methanol) dissolved in 30 grams of toluene was rapidly added to the stirred solution, raising the temperature to 83°. The product was stirred for one hour after the catalyst addition. Vapor phase chromatographic analysis of the product indicated complete reaction of the fluorene. The excess solvent and acrylate were removed by distillation, yielding 95 grams (89% crude yield) of viscous syrup. A flash distillation of this syrup on a small 6″ Vigreux column gave 74% yield of waxy yellow solid which when recrystallized from methanol gave a white solid, M.P. 46–47° C. The NMR spectrum of the solid product was consistent for the dibutyl ester of 9,9-bis(2-carboxyethyl)fluorene.

EXAMPLE 13

Thirty grams of toluene, 11.6 grams of (0.1 mole) indene, and 22 grams of (0.22 mole) ethyl acrylate were combined and 2 ml. of benzyltrimethylammonium ethoxide (40% in ethanol) in 6 grams of toluene were added over a 2-minute period. After a one-minute induction period the temperature began to rise rapidly to 94°, and the solution turned a red brown color. Vapor phase chromatographic analysis of the product after ½ hour indicated that 91.6% of the indene had reacted. Distillation of the product on a small Vigreux still gave 28 grams (89% yield) of viscous liquid, which the NMR spectrum indicated was a mixture of the diethyl ester of 1,1-bis(2-carboxyethyl)indene and the diethyl ester of 1,3-bis(carboxyethyl)indene. The mixture was separated by further distillation.

EXAMPLE 14

Eighteen grams (0.18 mole) ethyl acrylate, 17.5 grams of (0.15 mole) indole and 30 grams of toluene were combined and 2 grams benzyltrimethylammonium ethoxide (40% in ethanol) dissolved in 6 grams of toluene was added over a 3 minute period. The temperature began to rise slowly, going to a maximum of 71° C. The product was stirred for 1 hour and then distilled to remove solvent, yielding 37 grams of thick viscous oil. Distillation of this oil on a small Vigreux still yielded 24 grams (74% yield) of ethyl 3-(1-indole)propionate, B.P. 144° C. at 3 mm., $n_D^{25}$ 1.5534. The structure was confirmed by NMR spectroscopy.

EXAMPLE 15

Twelve grams (0.12 mole) of ethyl acrylate, 16.7 grams of (0.1 mole) of carbazole and 60 grams of toluene were combined and heated to 85° C. A portion of the solids failed to go into solution. Rapid addition of 2 grams of benzyltrimethylammonium ethoxide (40% in ethanol) in 6 grams of toluene to the slurry resulted in a red brown solution free of solids after 20 minutes. The solvent was stripped from the product and the residue, 30 grams of a viscous oil, was distilled, yielding 20.3 grams (76%) of ethyl 3-(9-carbazole)propionate, $n_D^{25}$ 1.6139. Identification was confirmed by NMR spectroscopy.

When the above experiment was repeated rapidly adding the catalyst at room temperature, a temperature rise to 33° resulted, and a 70% yield of ethyl 3-(9-carbazole)-propionate was obtained.

Following the procedures described in the examples, one produces the following compounds:

| Ex. | Polycyclic compound starting material | Catalyst [1] | Product |
|---|---|---|---|
| 16 | 3-ethylfluorene | A | Dibutyl ester of 3-ethyl-9,9-bis(2-carboxyethyl)fluorene. |
| 17 | 4-phenylfluorene | B | Diethyl ester of 4-phenyl-9,9-bis(2-carboxyethyl)fluorene. |
| 18 | 2-methoxyfluorene | A | Diethyl ester of 2-methoxy-9,9-bis(2-carboxyethyl)fluorene. |
| 19 [2] | 4-methylindole | C | Butyl 3-(4-methyl-1-indole) propionate. |
| 20 | 5-ethylindene | B | Diethyl ester of 5-ethyl-1,1-bis(2-carboxyethyl)indene. |
| 21 | 3-ethoxycarbazole | C | Ethyl 3-(3-ethoxy-9-carbazole) propionate. |
| 22 | 2-butylcarbazole | A | Ethyl 3-(2-butyl-9-carbazole) propionate. |
| 23 [3] | 2-decylindene | A | Di-2-ethylhexyl ester of 2-decyl-1,1-bis-(2-carboxyethyl) indene. |

[1] A=sodium amide plus diethylenetriamine; B=potassium amide plus diethyl sulfoxide; C=benzyltriethylammonium methoxide.
[2] Using butyl acrylate.
[3] Using 2-ethylhexyl acrylate.

What is claimed is:
1. A process for the production of esters of polycyclic compounds of the group

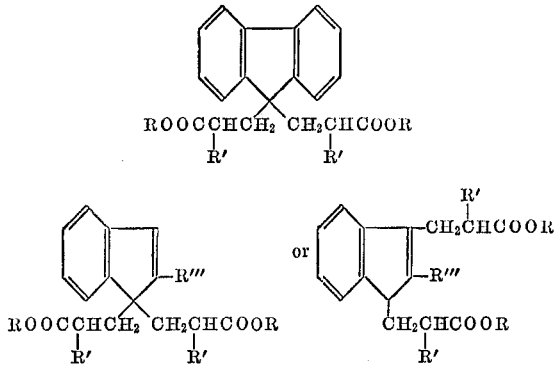

wherein R is alkyl of from 1 to about 10 carbon atoms, R' is hydrogen or methyl and R''' is hydrogen, alkyl of from 1 to 10 carbon atoms or aryl up to 10 carbon atoms, which comprises catalytically reacting in contact with a catalytic amount of a basic catalyst of the group benzyltrialkylammonium alkoxides and hydroxides wherein the alkyl group has from 1 to about 10 carbon atoms and the alkoxide group has from 1 to about 4 carbon atoms and the complex salts of an alkali metal amide with a lower dialkylsulfoxide or with a polyethylenepolyamine or dipropylenetriamine, a reactive mixture of an acrylate ester of the formula

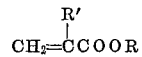

and the respective fluorene or indene, said reactive mixture produced by the rapid admixing of the components thereof and the catalyst at a rate of addition adequate to maintain sufficient active catalyst in the reaction mixture to insure completion of the reaction.

2. A process as claimed in claim 1, wherein the acrylate ester is ethyl acrylate.

3. A process as claimed in claim 1 for producing an ester as therein defined of the group:

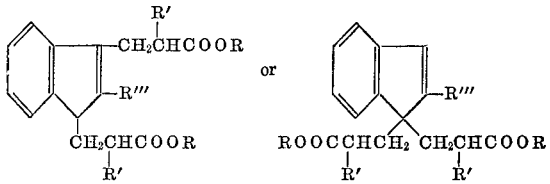

which comprises reacting an acrylate ester as defined in claim 1 with the respective indene.

4. A process as claimed in claim 3 wherein the acrylate ester is ethyl acrylate.

5. A process as claimed in claim 1 for producing an ester as therein defined of the formula:

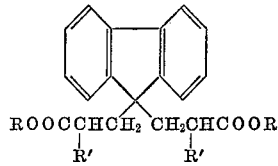

which comprises reacting an acrylate ester as defined in claim 1 with fluorene.

6. A process as claimed in claim 5 wherein the acrylate ester is ethyl acrylate.

7. A process as claimed in claim 5 wherein the acrylate ester is methyl acrylate.

8. A process as claimed in claim 5 wherein the acrylate ester is butyl acrylate.

9. A process as claimed in claim 5 wherein the acrylate ester is methyl methacrylate.

References Cited

UNITED STATES PATENTS 3,274,240  9/1966  Fritz _____ 260—515

OTHER REFERENCES

Bergmann, "The Michael Reaction," Organic Reactions, 10, pp. 182, 183, 234, 264, 544 (1959).

LORRAINE A. WEINBERGER, Primary Examiner
E. J. SKELLY, Assistant Examiner

U.S. Cl. X.R.
260—315, 326.13 R, 475 FR